(12) United States Patent
Chowdhury et al.

(10) Patent No.: US 12,580,456 B2
(45) Date of Patent: Mar. 17, 2026

(54) ROTOR POWER TRANSFER CIRCUIT FOR ELECTRIC MACHINE

(71) Applicant: GM GLOBAL TECHNOLOGY OPERATIONS LLC, Detroit, MI (US)

(72) Inventors: Mazharul Chowdhury, Canton, MI (US); Muhammad A. Zahid, Troy, MI (US); Alexander Forsyth, Windsor (CA); Khorshed Mohammed Alam, Canton, MI (US); Yilun Luo, Ann Arbor, MI (US); Junghoon Kim, Springboro, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 362 days.

(21) Appl. No.: 18/482,224

(22) Filed: Oct. 6, 2023

(65) Prior Publication Data

US 2025/0119034 A1 Apr. 10, 2025

(51) Int. Cl.
H02K 11/33 (2016.01)
H02K 3/28 (2006.01)

(52) U.S. Cl.
CPC .............. H02K 11/33 (2016.01); H02K 3/28 (2013.01); H02K 2203/09 (2013.01)

(58) Field of Classification Search
CPC ....... H02K 11/33; H02K 3/28; H02K 2203/09
See application file for complete search history.

(56) References Cited

U.S. PATENT DOCUMENTS

| | | | |
|---|---|---|---|
| 11,784,501 B2* | 10/2023 | Green | B60R 16/033 |
| | | | 318/505 |
| 2018/0147947 A1* | 5/2018 | Gebhart | B60L 50/51 |
| 2018/0254732 A1* | 9/2018 | Smolenaers | H02J 1/12 |
| 2025/0357811 A1* | 11/2025 | Kobayashi | B64D 27/33 |

FOREIGN PATENT DOCUMENTS

| | | |
|---|---|---|
| DE | 102020105365 A1 | 9/2021 |
| DE | 102023110860 A1 | 10/2024 |

* cited by examiner

*Primary Examiner* — Zoheb S Imtiaz
(74) *Attorney, Agent, or Firm* — Quinn IP Law

(57) ABSTRACT

A rotor power transfer circuit for an electric machine. The rotor power transfer circuit may include a multiple leaf direct current (DC)-to-DC (DC-DC) converter having a plurality of branches connected in parallel to a source of DC power. The branches may include a plurality of switches operable for selectively controlling DC power transfer therethrough according to a plurality of rotor winding excitations modes. The rotor power transfer circuit may include an electrical interface configured for electrically connecting each branch with one of a one or more rotor windings wrapped around a plurality of circumferentially spaced rotor protrusions of the electric machine.

20 Claims, 8 Drawing Sheets

ROTOR POWER TRANSFER CIRCUIT FOR ELECTRIC MACHINE

INTRODUCTION

The present disclosure relates to rotor power transfer circuits, such as but not necessarily limited to rotor power transfer circuits operable for exciting rotor windings of an electric machine.

A rotor of an electric machine, such as separately excited machine (SEM), may include brushes and slip rings for conductively transferring power to a plurality of rotor windings. The resulting excitation of the rotor windings may produce a magnetic field operable with a stator generated electric field to create an output torque. The physical and electrical dynamics of the brushes and slips rings may limit a switching frequency, present tracking difficulties, and otherwise produce other constraints on exciting the rotor windings.

SUMMARY

One non-limiting aspect of the present disclosure relates to a rotor power transfer circuit operable for ameliorating constraints and other limitations on rotor winding excitation resulting from physical and/or electrical dynamics of brushes and slip rings or other electrical connections utilized to facilitate powering transfer to rotor windings of an electric machine. The rotor power transfer circuit may be operable for providing rotor field excitation via two independent brushes loops, optionally at a relatively low frequency, such that a summation of both excitation signals may result in the rotor windings experiencing a beneficial, and optional greater, switching effect. The rotor power transfer circuit may be operable such that the current received at each brush may be reduced to result in lower current density per brush, which may allow for a wider variety of brushes to be selected. Each positive and negative slip ring may receive one or both of a non-time shifted and time shifted waveforms to allow for the currents to be correspondingly summed or added without requiring rewinding of the rotor windings. This superposition effect may result in a lower current ripple, improved tracking, and further reductions in electromagnetic interference (EMI) performance.

One non-limiting aspect of the present disclosure relates to a rotor power transfer circuit for an electric machine. The circuit may include a multiple leaf direct current (DC)-to-DC (DC-DC) converter having a plurality of branches connected in parallel to a source of DC power, with each branch including a plurality of switches operable for selectively controlling DC power transfer therethrough. The circuit may further include an electrical interface configured for electrically connecting each branch with one of a one or more rotor windings wrapped around a plurality of circumferentially spaced rotor protrusions of the electric machine and a controller operable for controlling the switches according to a plurality of rotor winding excitations modes.

The rotor winding excitation modes may include a powered excitation mode for transferring DC power from the source to one or more of the rotor windings.

The rotor windings may include a first rotor winding, the plurality of branches include a first branch and a second branch, and the powered excitation mode may include transferring the DC power simultaneously through the first and second branches to the first rotor winding.

The powered excitation mode may include transferring the DC power through the first branch out of phase relative to the DC power transferred through the second branch.

The rotor windings includes a first rotor winding and second rotor winding, the plurality of branches may include a first branch and a second branch, and the powered excitation mode may include transferring the DC power simultaneously through the first branch and the second branch, optionally with the first branch transferring the DC power to the first rotor winding and the second branch transferring the DC power to the second rotor winding.

The rotor winding excitation modes may include a decaying excitation mode for transferring DC power from one or more of the rotor windings to the source.

The rotor winding excitation modes may include a freewheeling excitation mode for providing a source bypass connection for one or more of the rotor windings. The source bypass connection may bypass the source to independently connect together a positive terminal and a negative terminal of the rotor windings associated therewith.

The rotor winding excitation modes may include a decaying excitation mode for providing a reverse connection for one or more of the rotor windings. The reverse connection may connect the rotor winding associated therewith to the source with reversed polarity.

The rotor power transfer circuit may include a DC link capacitor connected in a parallel between the source and the multiple leaf direct current DC-DC converter.

One non-limiting aspect of the present disclosure relates to a rotor power transfer circuit for an electric motor, the electric motor operable for propelling a vehicle. The circuit may include a multiple leaf direct current (DC)-to-DC (DC-DC) converter having a first branch and a second branch connected in parallel to a source of DC power, optionally with the first branch including a plurality of first switches operable for selectively controlling DC power transfer therethrough and the second branch including a plurality of second switches operable for selectively controller DC power transfer therethrough. The circuit may further include an electrical interface configured for electrically connecting the first and second branches with a plurality of rotor windings of the electric motor and a controller operable for controlling the first and second switches according to a plurality of rotor winding excitations modes.

The rotor winding excitation modes may include a powered excitation mode for transferring DC power from the source simultaneously through the first and second branches to the rotor windings.

The powered excitation mode may include transferring the DC power through the first branch that is phase shifted relative to the DC power transferred through the second branch.

The first branch may include a first inside leg and a first outside leg connected in parallel across the source, with the first inside leg including a first upper switch of the first switches connected in series with a first lower diode and the first outside leg including a first lower switch of the first switches connected in series with a first upper diode.

The second branch may include a second inside leg and a second outside leg connected in parallel across the source, with the second inside leg including a second upper switch of the second switches connected in series with a second lower diode and the second outside leg including a second lower switch of the second switches connected in series with a second upper diode.

The electrical interface may connect a positive terminal of the rotor windings to the first inside leg between the first upper switch and the first lower diode and to the second inside leg between the second upper switch and the second lower diode. The electrical interface may further connect a negative terminal of the rotor windings to the first outside leg between the first lower switch and the first upper diode and to the second outside leg between the second lower switch and the second upper diode.

One non-limiting aspect of the present disclosure relates to a rotor power transfer circuit for an electric motor of a vehicle having a plurality of rotor winding sets wrapped around each of a plurality of circumferentially spaced rotor poles. The circuit may include a multiple leaf direct current (DC)-to-DC (DC-DC) converter having a first branch and a second branch connected in parallel to a source of DC power, with the first branch including a plurality of first switches operable for selectively controlling DC power transfer therethrough and the second branch including a plurality of second switches operable for selectively controller DC power transfer therethrough. The circuit may further include an electrical interface having a first interface configured for electrically connecting the first branch with a first winding set of the rotor winding sets and a second interface configured for electrically connecting the second branch with a second winding set of the rotor winding sets and a controller operable for controlling the first and second switches according to a plurality of rotor winding excitations modes.

The rotor winding excitation modes may include a dual powered excitation mode for transferring DC power from the source simultaneously through the first and second branches respectively to the first and second rotor winding sets.

The rotor winding excitation modes may include a powered-freewheeling excitation mode for transferring DC power from the source through the first branch to the first winding set and providing a source bypass connection for the second rotor winding set, the source bypass connection bypassing the source to independently connect together a positive terminal and a negative terminal of the second rotor winding set.

The rotor winding excitation modes may include a decaying excitation mode for providing a reverse connection for the first and/or second rotor winding sets, with the reverse connection electrically connecting the rotor winding associated therewith to the source with reversed polarity.

The first branch may include a first inside leg and a first outside leg connected in parallel across the source, with the first inside leg including a first upper switch of the first switches connected in series with a first lower diode and the first outside leg including a first lower switch of the first switches connected in series with a first upper diode.

The second branch may include a second inside leg and a second outside leg connected in parallel across the source, with the second inside leg including a second upper switch of the second switches connected in series with a second lower diode and the second outside leg including a second lower switch of the second switches connected in series with a second upper diode.

The electrical interface may connect a first positive terminal of the first rotor winding set to the first inside leg between the first upper switch and the first lower diode, a first negative terminal of the first rotor winding set to the first outside leg between the first lower switch and the first upper diode; a second positive terminal of the second rotor winding set to the second inside leg between the second upper switch; and a second negative terminal of the second rotor winding set to the second outside leg between the second lower switch and the second upper diode.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
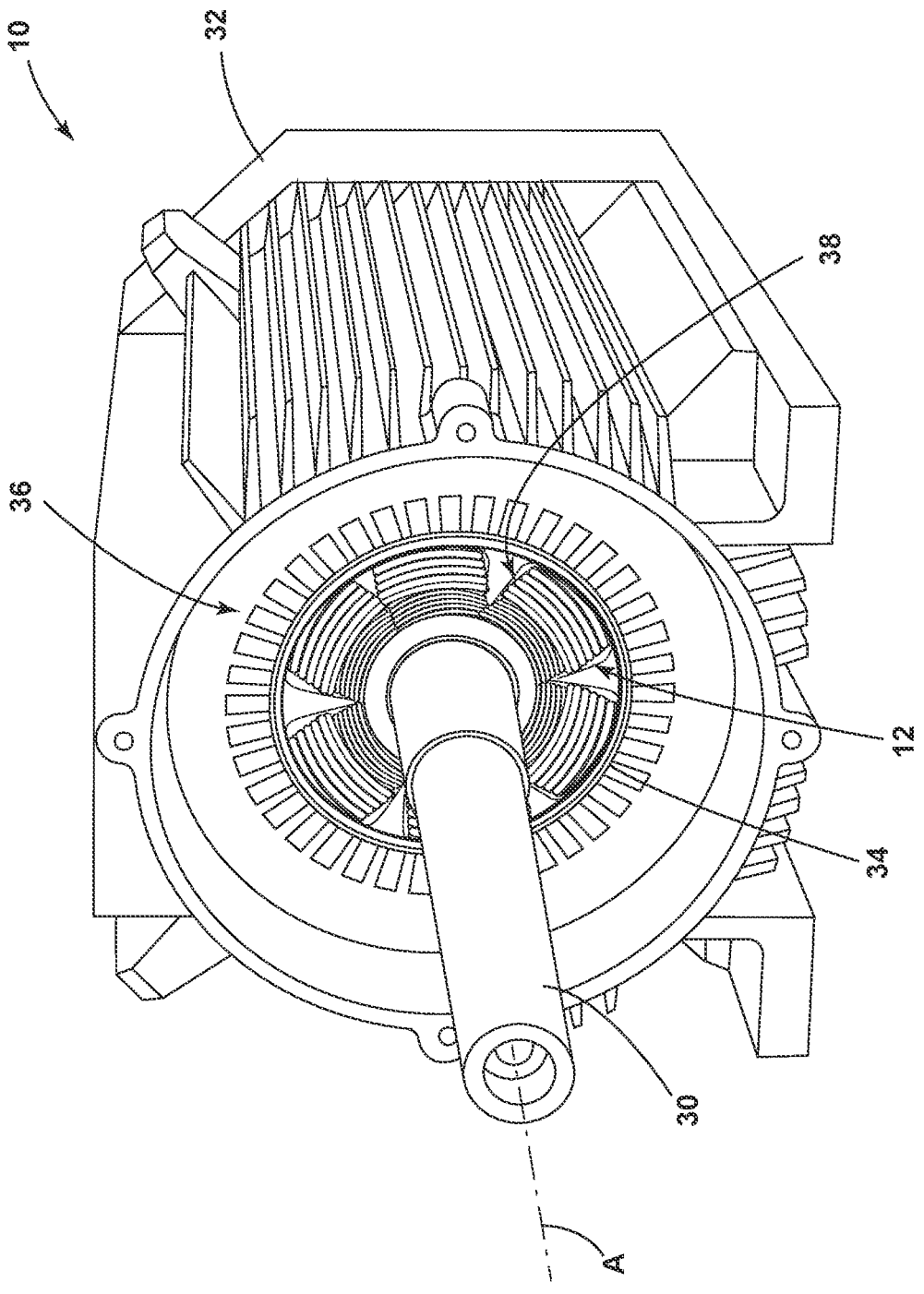
FIG. 1 illustrates a schematic view of an electric machine in accordance with one non-limiting aspect of the present disclosure.
Figure 2:
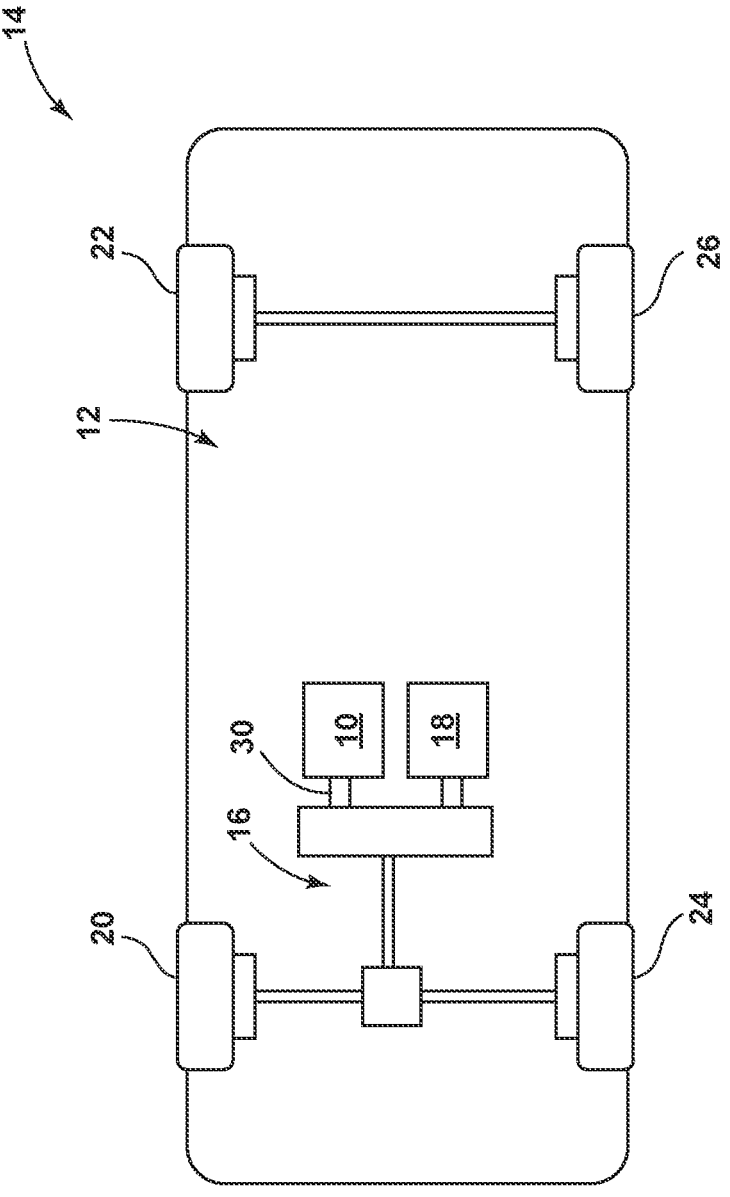
FIG. 2 illustrates a schematic view of a vehicle having the electric machine in accordance with one non-limiting aspect of the present disclosure.

FIG. 1 illustrates a schematic view of an electric machine 10 in accordance with one non-limiting aspect of the present disclosure. The electric machine 10 may be of the type employing a rotor 12 to impart mechanical force to a load in proportion to an electrical excitation thereof and/or to generate electrical energy in response to the rotation thereof. The electric machine 10, at least in the illustrated configuration, may be referred to as an electric motor 10 operable for propelling a vehicle and/or regenerative braking. FIG. 2 illustrates a schematic view of a vehicle 14 having the electric motor 10 in accordance with one non-limiting aspect of the present disclosure. The electric motor 10 may be employed within the vehicle 14 to facilitate imparting mechanical force to a propulsion system, powertrain, or drivetrain 16 operable for propelling or otherwise driving the vehicle 14. The vehicle 14 is illustrated as a hybrid type due to the powertrain 12 optionally including an internal combustion engine (ICE) 18. The powertrain 16 may include a transmission, a driveshaft, a differential, axles and/or other componentry to facilitate conveying rotative force from a rotor shaft 30 coupled with the rotor 10 (see FIG. 1) to the wheels 20, 22, 24, 26. The vehicle 14 is shown to include the powertrain 12 operable with the front wheels 20, 24 for non-limiting purposes as the present disclosure fully contemplates its use and application with four-wheel drive automobiles and other, non-automobile types of vehicles.

Returning to FIG. 1, the electric motor 10 may include a housing 32 configured to support a rearward end (not shown) of the rotor shaft 30 while permitting the rotor 10 to rotate within an airgap 34 relative to a stator 36. The stator 36 may be disposed annularly around the rotor 10 for purposes of generating a rotating magnetic field (RMF), which as one skilled in the art may appreciate, may be used to impart a rotational torque sufficient for rotating the rotor 10. While not shown in detail, the stator 36 may include stator windings or other features capable of being electrically excited for purposes of controlling the RMF and the resulting rotation of the rotor 10. The rotor 10 may include a plurality of rotor windings 38 wrapped around a plurality of circumferentially spaced rotor protrusions 42, which when excited, may be used to induce a rotor magnetic field within a corresponding plurality of rotor poles 44 (see FIG. 3). The rotor magnetic field may interact with the RMF to facilitate rotating the rotor shaft 30 to propel the vehicle 14 and/or for regenerative braking in response to rotation of the rotor shaft. The rotor 10 may be formed with a generally annular shape, optionally from a plurality of laminations stack in a side-by-side facing relationship axially along an access of rotation A. While generically shown in FIG. 1, and as detailed below in more detail below, the present disclosure contemplates the 12 having the rotor protrusions 42 wrapped or otherwise configured with one or more separately excitable rotor windings 38, i.e., wrapping the rotor protrusions 42 with distinct and independently excitable sets of rotor windings 38.

Figure 3:
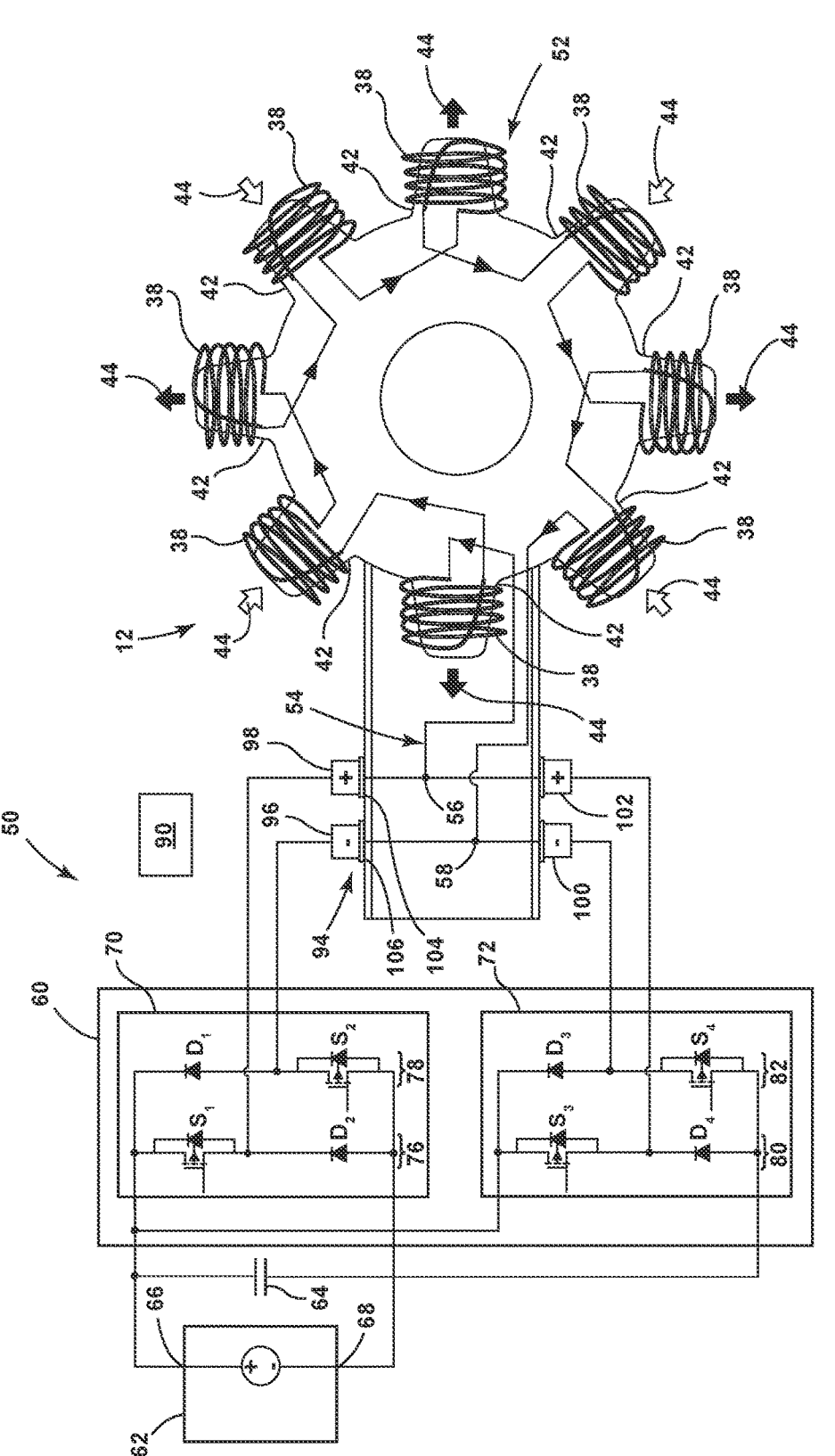
FIG. 3 illustrates a schematic view of a rotor transfer circuit operable with a rotor having a single set of rotor windings in accordance with one non-limiting aspect of the present disclosure.

FIG. 3 illustrates a schematic view of a rotor transfer circuit 50 operable with a single set of rotor windings 52 in accordance with one non-limiting aspect of the present disclosure. The single set of rotor windings 52 may correspond with the rotor windings 38 wrapped around the rotor protrusions 42 being electrically connected to a rotor winding circuit 54, which is illustrated to be in series but may be otherwise. The rotor winding circuit 54 is shown with respect to connecting the rotor windings 38 such that a polarity or directionality (shown with arrows) of each rotor pole 44 is opposite or different from the adjoining rotor poles 44, which is done for exemplary purposes as the present disclosure fully contemplates the rotor winding circuit 54 having other configurations, including those whereby one or more adjoining rotor poles 44 may have the same or different polarity. The configuration of the rotor winding circuit 54 may be a design parameter that may vary depending on operational considerations of the electric motor 10. The rotor transfer circuit 50 described herein may be advantageously operable for providing excitation of rotor windings 38 for a wide variety of rotor winding circuit 54 configurations. The rotor transfer circuit 50, more specifically, may be configured for providing direct current (DC) excitation of the rotor windings 38 via DC power transferred through an input terminal (e.g., positive terminal) 56 and an output terminal (e.g., negative terminal) 58 of the rotor winding circuit 54.

The rotor transfer circuit 50 may include a DC-to-DC (DC-DC) converter 60 operable controlling DC power transfer to and from the rotor windings 38, such as to control DC power transfer between the rotor windings 38 and a source 62 of DC power. The source 62 may optionally correspond with a rechargeable energy storage system (RESS) operable for storing and supplying DC power. A DC link capacitor 64 may be connected across a positive terminal 66 and a negative terminal 68 of the source 62 to facilitate filtering and smoothing the DC power. The DC-DC converter 60 may be configured as a multiple leaf DC-DC converter 60 having a plurality of branches 70, 72 connected in parallel to the source 62. The configuration illustrated in FIG. 3 is shown with a first branch 70 and a second branch 72 being connected in parallel to the source 62. The first branch 70 may include a plurality of first switches S1, S2 and the second branch 72 may similarly include a plurality of second switches S3, S4. The switches S1, S2 may be semiconductor switches, transistors, etc. capable of being selectively controlled between opened and closed states. More specifically, the first branch 70 may include a first inside leg 76 having a first upper switch S1 connected in series with a first lower diode D2 and a first outside leg 78 having a first lower switch S2 connected in series with a first upper diode D1. The second branch 72 may similarly include a second inside leg 80 having a second upper switch S2 connected in series with a second lower diode D4 and a second outside leg 82 having a second lower switch S4 connected in series with a second upper diode D3. A controller 90 may be included to facilitate controlling the DC-DC converter 60 according to a plurality of excitation modes, which may include selectively controlling the switches S1, S2, S3, S4 to control excitation of the rotor windings 38.

The rotor transfer circuit 50 may include an electrical interface 94 configured for electrically connecting each branch 70, 72 with the rotor windings 38. The electrical interface 94 shown in FIG. 3 may be characterized as a brush-slip configuration whereby brushes and slips may be used for commuting electrical power between the DC-DC converter 60 and the winding circuit 54. The electrical interface 94, for example, may include brushes 96, 98, 100, 102 operable for exchanging electrical power with slip rings 104, 106, with the a first positive brush 96 and a first negative brush 98 connecting with the first branch 70 and a second positive brush 102 and a second negative brush 100 connecting with the second branch 72. The first and second positive and negative brushes 96, 98, 100, 102 may be correspondingly positioned to physically contact a positive slip ring 104 and a negative slip ring 106 attached to the rotor 12, with the physical contact being operable for facilitating electrically power exchange therebetween while the rotor 12 is stationary and rotating. The present disclosure fully contemplates the electrical interface 94 having other configurations suitable for providing electrical energy to and/or to receive electrical energy from the rotor windings 38, such as via capacitive and/or inductive type of couplings whereby physical contact between the DC-DC converter 60 and the rotor winding circuit 54 may be unnecessary.

Figure 4:
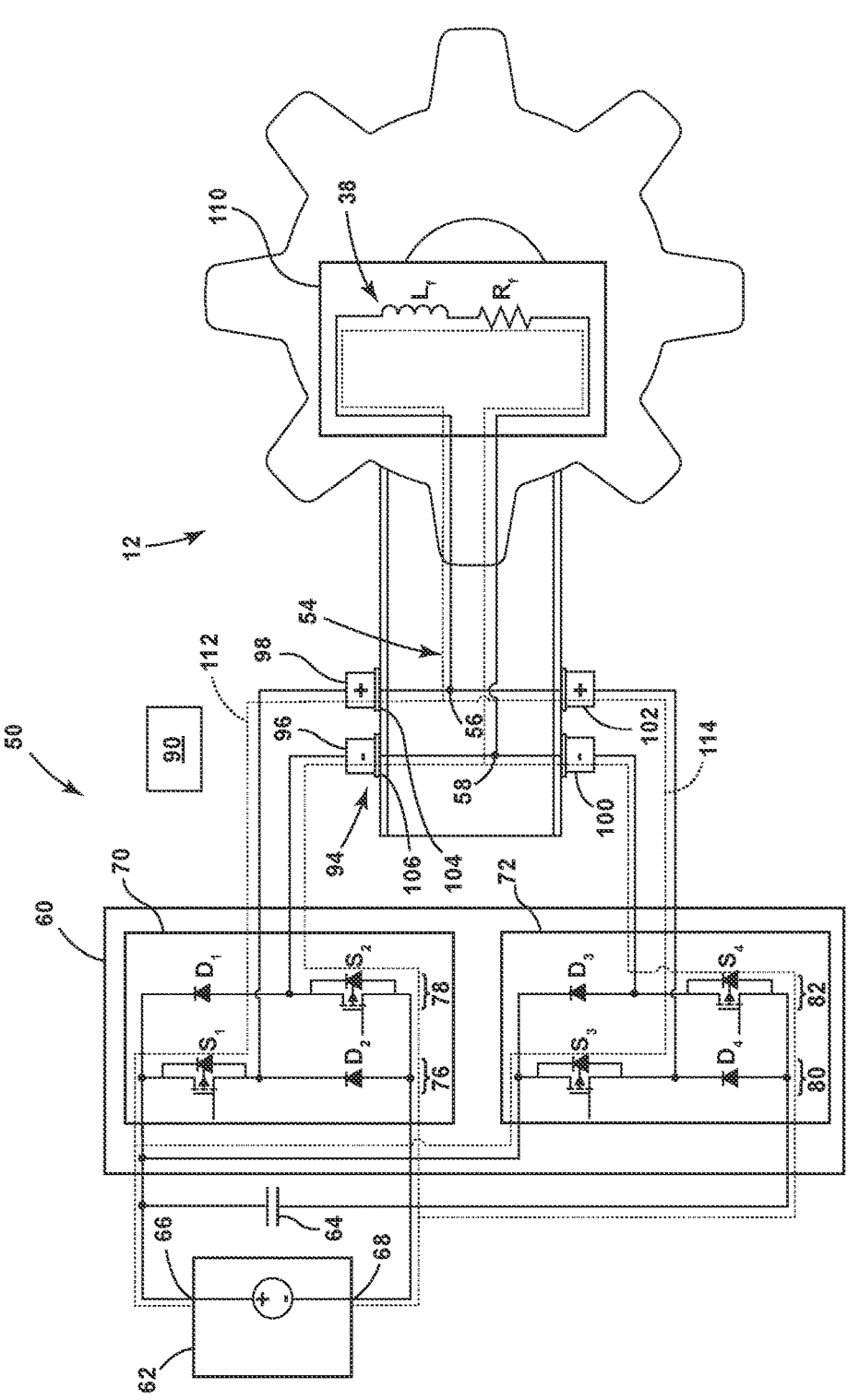
FIG. 4 illustrates a schematic diagram demonstrating a power excitation mode in accordance with one non-limiting aspect of the present disclosure.

FIG. 4 illustrates a schematic diagram demonstrating control of the rotor transfer circuit 50 according to a power excitation mode in accordance with one non-limiting aspect of the present disclosure. For presentation simplicity, the diagram illustrates an equivalent circuit 110 for the rotor windings 38, which is one skilled in the art may appreciate, may be generally reference with an inductor Lf and a resistor Rf. The power excitation mode may correspond with the controller 90 controlling the switches S1, S2, S3, S4 so as to transfer DC power from the source 62 to one or more of the rotor windings 38. The power excitation mode is shown with respect to the first branch 70 providing a first DC current 112 and the second branch 72 providing a second DC current 114, with the first and second DC currents 112, 114 summing at the input terminal 56 of the rotor winding circuit 54. This may be referred to as a dual-powered excitation mode whereby the rotor windings 38 may be simultaneously excitation with the first and second DC currents 112, 114. The dual-powered excitation mode may correspond with the controller 90 controlling the first and second upper switches S1, S3 and the first and second lower switches to a closed or on position. The controller 90 may be similarly operable for providing a mono-powered excitation mode whereby one of the first or second DC currents 112, 114 may be provided to the rotor windings 38, i.e., instead of the first and second branches 70, 72 both providing current to the rotor windings 38, one of the branches 70, 72 may be prevented from providing current to the rotor windings 38. In the event it may be desirable to provide only the first current 112, the first upper and lower switches S1, S2 may be closed while the second upper and lower switches are opened. Similarly, in the event it is desirable to provide only the second current 114, the second upper and lower switches S3, S4 may be closed while the first upper and lower switches are opened S1, S2.

Figure 5:
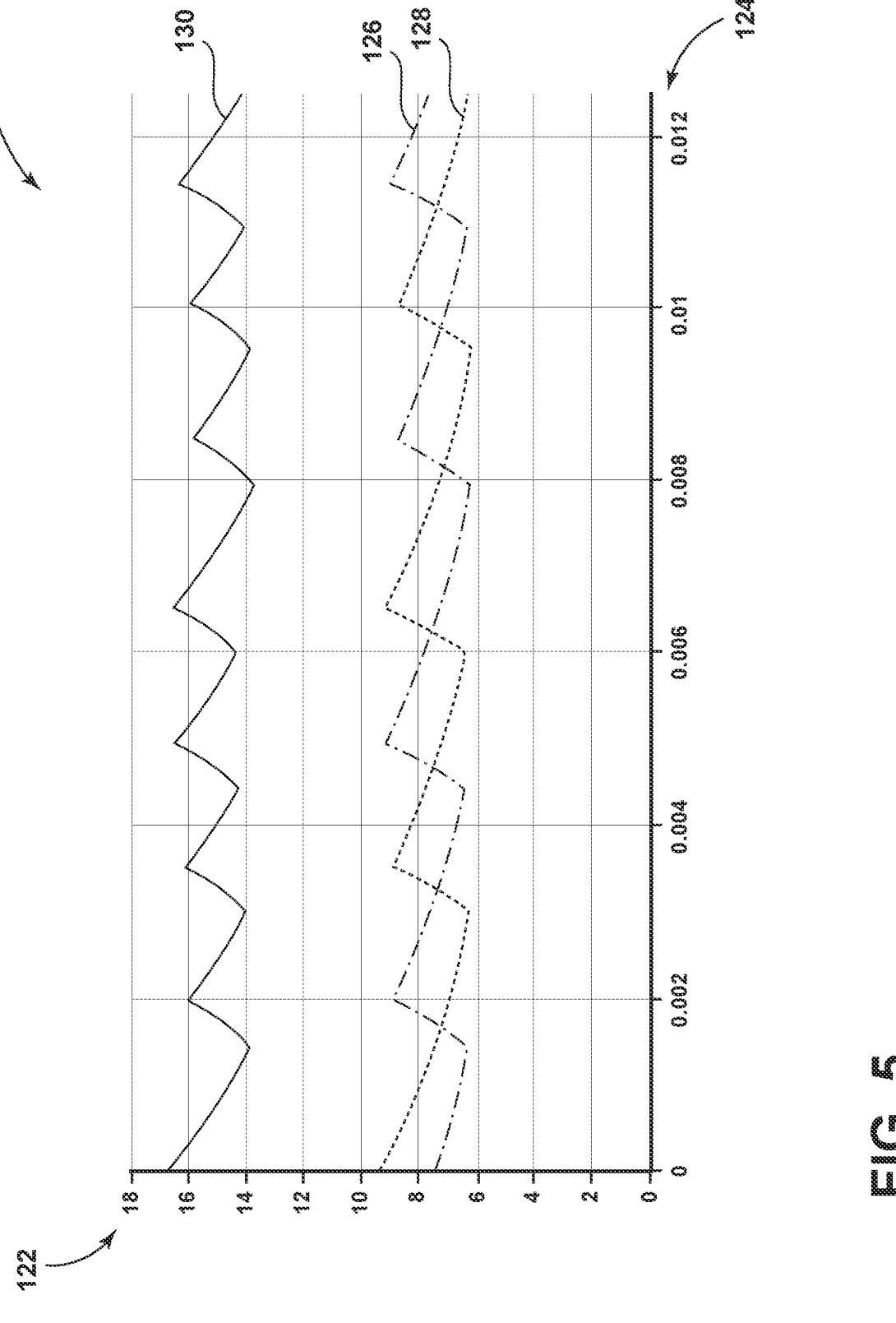
FIG. 5 illustrates a dual-powered graph for a dual-powered excitation mode in accordance with one non-limiting aspect of the present disclosure.
Figure 6:
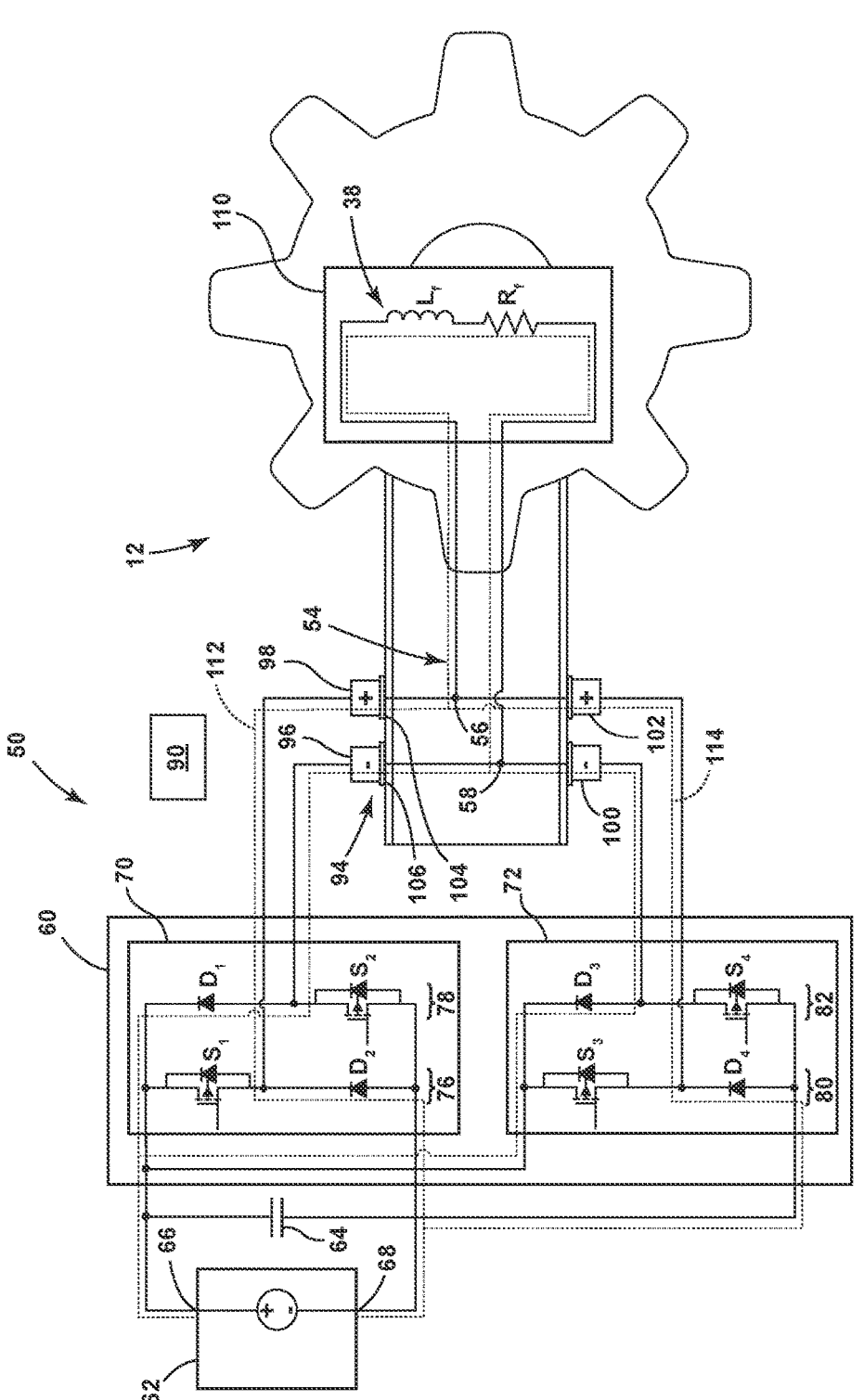
FIG. 6 illustrates a schematic diagram demonstrating a decaying excitation mode in accordance with one non-limiting aspect of the present disclosure.

The capability of the rotor transfer circuit 50 to simultaneously provide excitation currents 112, 114 from different branches 70, 72 may be advantageous in ameliorating constraints and other limitations on rotor winding excitation resulting from physical and/or electrical dynamics of brushes and slip rings or other electrical connections. FIG. 5 illustrates a dual-powered graph 120 for the dual-powered excitation mode, which may include a vertical axis 122 representing current, a horizontal axis 124 representing time, a first current graph 126 representing the first current provided 112 via the first branch 70, a second current graph 128 representing the second current 114 provided via the second branch 72, and a summation graph 130 representing a summation of the first and second currents 112, 114 at the terminal 56. The rotor power transfer circuit 50 may be operable for providing rotor field excitation, i.e., first and second DC currents 112, 114, via the two independent brushes loops, optionally at a relatively low frequency, such that the summation thereof may result in the rotor windings 38 experiencing a beneficial, and optional greater, switching effect. The rotor power transfer circuit 50 may be operable such that the current 112, 114 received at each brush may be reduced to result in lower current density per brush, which may allow for a wider variety of brushes to be selected. While shown with the first current 112 being time shifted or out of phase relative to the second current 116, each positive and negative slip ring 104, 106 may receive one or both of a non-time shifted and time shifted waveforms, i.e., first and second currents 112, 114, to allow for the currents 112, 114 to be correspondingly summed or added without requiring rewinding of the rotor windings 38. This superposition effect may result in a lower current ripple, improved tracking, and further reductions in electromagnetic interference (EMI) performance FIG. 6 illustrates a schematic diagram demonstrating control of the rotor transfer circuit 50 according to a decaying excitation mode in accordance with one non-limiting aspect of the present disclosure. The decaying excitation mode may correspond with connecting the rotor windings 38 via the first and/or second branches 70, 72 to the source 62 with reverse polarity, i.e., with a reverse connection for electrically connecting the rotor winding associated therewith to the source 62 with reversed polarity. The decaying excitation mode, in other words, may correspond with reversing a directionally of the connection providing via the DC-DC converter 60 between the source 62 and the rotor windings 38 so that electrical power residing in the rotor windings 38 may be dispersed to the source 62. The decaying excitation mode may correspond with the controller 90 controlling the first and second upper switches S1, S2 and the first and second lower switches S3, S4 to an opened position. The controller 90 may be similarly operable for providing a mono-decaying excitation mode whereby one of the first or second branches 70, 72 may be connected with reverse polarity while the other is disconnected. In the event it is desirable to provide reverse polarity via the first branch 70 only, the first upper and lower switches S1, S2 may be opened while the second upper switch S3 is closed and the second lower switch S4 is opened. Similarly, in the event it is desirable to provide reverse polarity via the second branch 72 only, the second upper and lower switches S3, S4 may be opened while the first upper switch S1 is closed and the first lower switch is opened S2.

Figure 7:
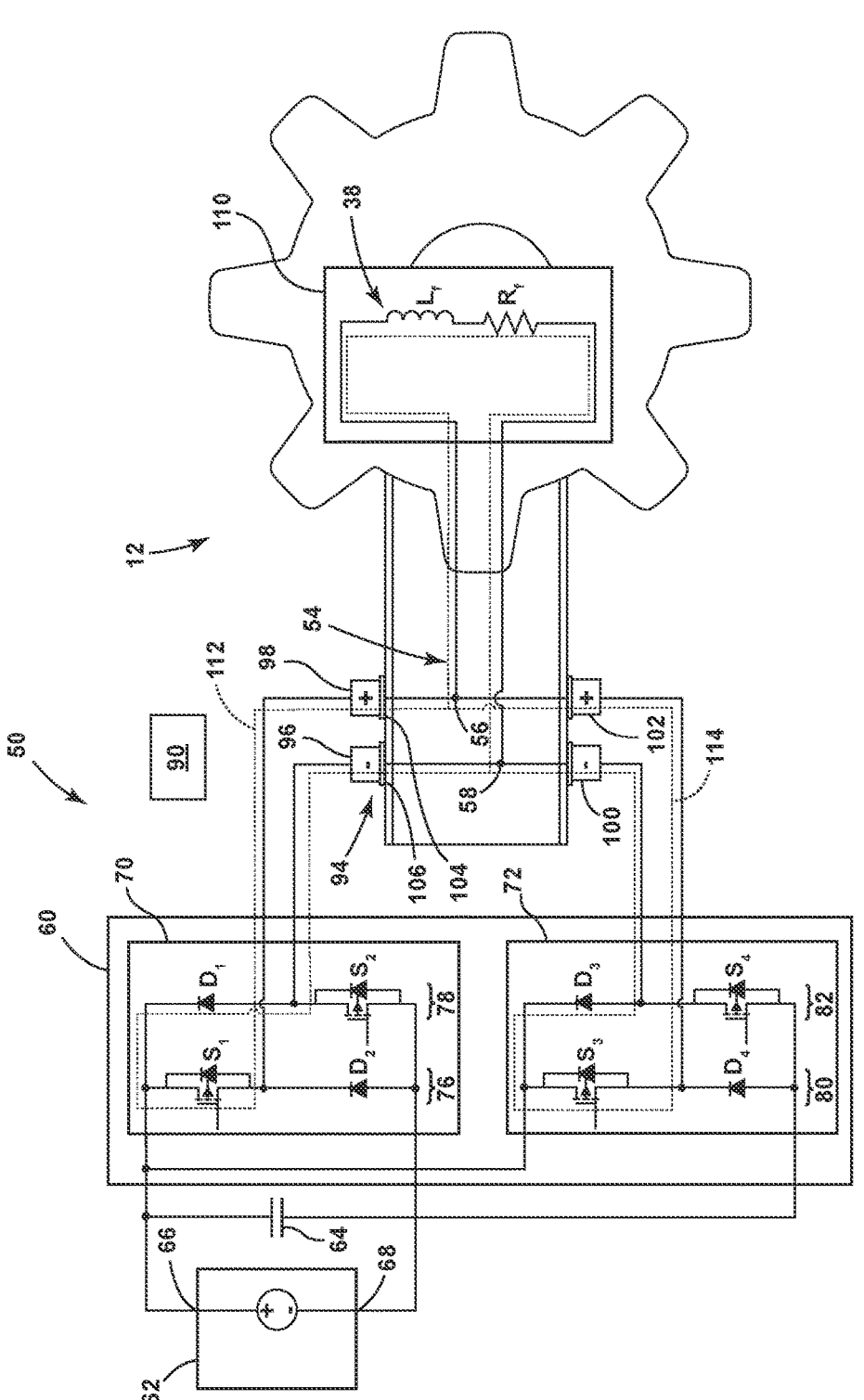
FIG. 7 illustrates a schematic diagram demonstrating a freewheeling excitation mode in accordance with one non-limiting aspect of the present disclosure.

FIG. 7 illustrates a schematic diagram demonstrating control of the rotor transfer circuit 50 according to a freewheeling excitation mode in accordance with one non-limiting aspect of the present disclosure. The freewheeling excitation mode may correspond with connecting the rotor windings 38 via the first and/or second branches 70, 72 with a source bypass connection, with the source bypass connection bypassing the source 62 to independently connect together the positive terminal 56 and the negative terminal 58 of the rotor windings 38 via the DC-DC converter 60. The freewheeling excitation mode, in other words, may correspond with the first and second branches 70, 72 being controller to effectively short out the rotor windings 38 so that any residual power therein may parasitically dissipate. The capability to dissipate electrical power from the rotor windings 38 without draining to the source 62 may be beneficial in maximizing longevity of the source 62. The freewheeling excitation mode may correspond with the controller 90 controlling the first and second upper switches S1, S3 to the closed position and the first and second lower switches S2, S4 to the opened position.

Figure 8:
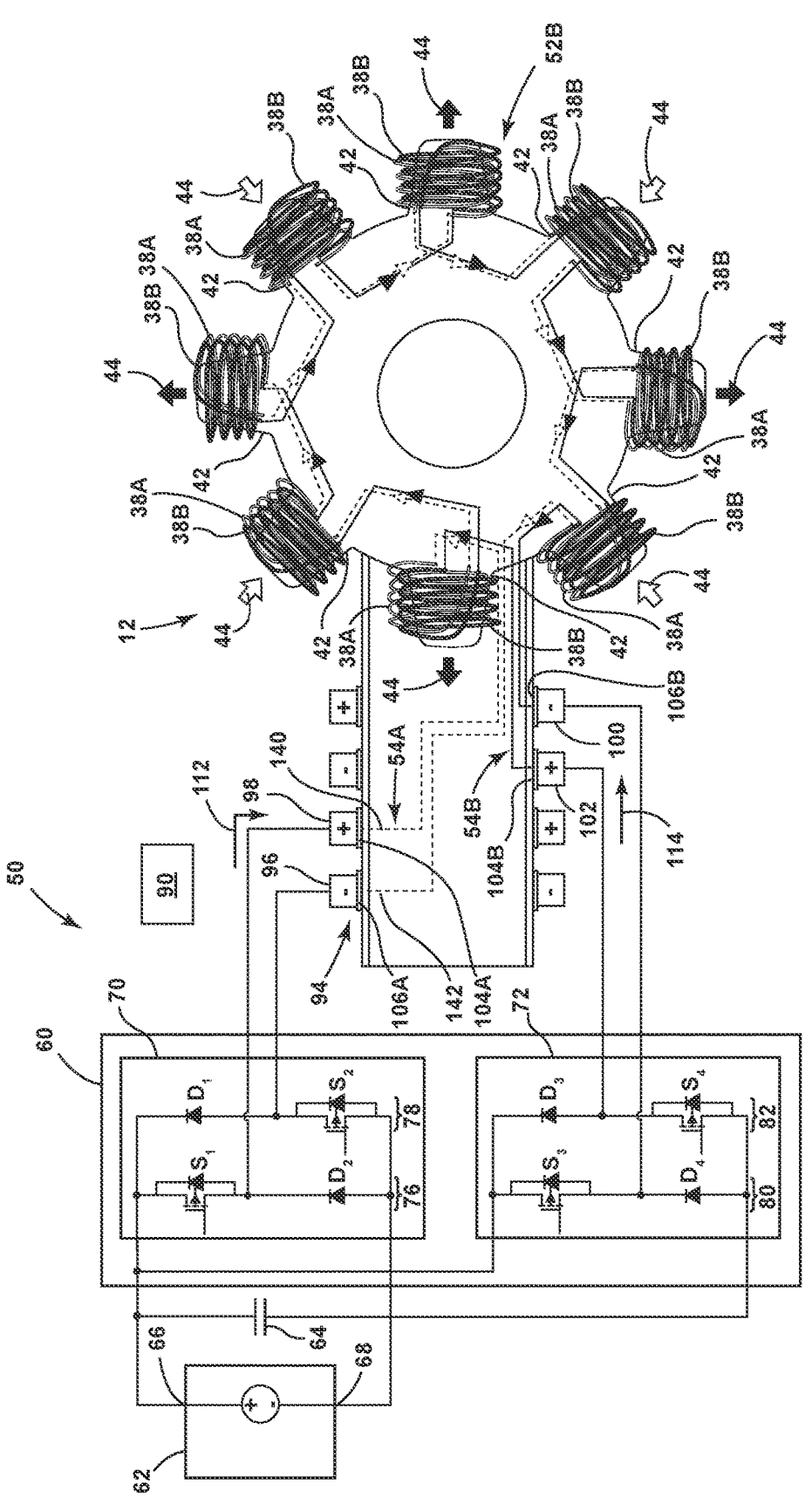
FIG. 8 illustrates a schematic view of the rotor transfer circuit operable with a rotor having a plurality of rotor winding sets in accordance with one non-limiting aspect of the present disclosure.

FIG. 8 illustrates a schematic view of the rotor transfer circuit 50 operable with a plurality of rotor winding sets 52A, 52B in accordance with one non-limiting aspect of the present disclosure. While additional rotor winding sets 52A, 52B are contemplated, the rotor 12 is shown to include a first rotor winding set 52A and a second rotor winding set 52B in what may be considered as a dual-winding implementation, which is shown to be based on conductive coupling with the rotor transfer circuit 50, however, this topology may also be suitable for use with inductive and/or capacitive coupling. The multiple winding sets 52A, 52B may correspond with distinct rotor windings 38A, 38B wrapped around each of the rotor protrusions 42 such that each of the corresponding rotor poles 44 includes two, separate sets of rotor windings 38A, 38B. The above-described electrical interface 94 and rotor winding circuits 54 may be altered such that the positive and negative brushes 96, 98 may be connected to a first rotor winding circuit 54A and associated with the first rotor winding set 52A and the positive and negative brushes 102, 104 may be connected to a second rotor winding circuit 54B and associated with the second rotor winding set 52B. In particular, a first positive terminal 140 of the first rotor winding set 52A may connect to the first inside leg 76 between the first upper switch S1 and the first lower diode D2, a first negative terminal 142 of the first rotor winding set 52A may connect to the first outside leg 78 between the first lower switch S2 and the first upper diode D1, a second positive terminal 102 of the second rotor winding set 52B may connect to the second inside leg 80 between the second upper switch S3 and the second lower diode D4, and a second negative terminal 104 of the second rotor winding set 52B may connect to the second outside leg 82 between the second lower switch S4 and the second upper diode D3.

The controller 90 may be configured for utilizing the rotor transfer circuit 50 to facilitate controlling excitation of the first and second rotor winding sets 52A, 52B according to similar excitation modes. The rotor winding excitation modes may include a dual powered excitation mode for transferring DC power from the source 62 simultaneously through the first and second branches 70, 72 respectively to the first and second rotor windings 52A, 52B, i.e., by providing the first current 112 to the first rotor winding 52A set separately from the second current 114 being provided to the second rotor winding set 52B. The rotor winding excitation modes may include a powered-freewheeling excitation mode for transferring DC power from the source 62 through the first branch 70 to the first or second winding 52A, 52B set while simultaneously providing a source 62 bypass connection for the other of the first or second rotor winding sets 52A, 52B. The rotor winding excitation modes include a decaying excitation mode for providing a reverse connection for the first and/or second rotor windings 52A, 52B, with the reverse connection electrically connecting the rotor winding set 52A, 52B associated therewith to the source 62 with reversed polarity. The controller 90 may include a plurality of non-transitory instructions stored on a computer-readable storage medium, which when executed with one or more associated processors, may be operable for providing the control methodologies described herein, i.e., implementing the selective opening and closing of the switches S1, S2, S3, S4 included as part of the DC-DC converter 60.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A rotor power transfer circuit for an electric machine, comprising:

a multiple leaf direct current (DC)-to-DC (DC-DC) converter having a plurality of branches connected in parallel to a source of DC power, each branch including a plurality of switches operable for selectively controlling DC power transfer therethrough;

an electrical interface configured for electrically connecting each branch with one of a one or more rotor windings wrapped around a plurality of circumferentially spaced rotor protrusions of the electric machine; and a controller operable for controlling the switches according to a plurality of rotor winding excitations modes;

wherein:

the rotor winding excitation modes includes a powered excitation mode, the powered excitation mode transferring DC power from the source to one or more of the rotor windings;

the rotor windings includes a first rotor winding and second rotor winding;

the plurality of branches include a first branch and a second branch; and the powered excitation mode transfers the DC power simultaneously through the first branch and the second branch, with the first branch transferring the DC power to the first rotor winding and the second branch transferring the DC power to the second rotor winding.

2. The rotor power transfer circuit according to claim 1, wherein:

the rotor winding excitation modes include a decaying excitation mode, the decaying excitation mode transferring DC power from one or more of the rotor windings to the source.

3. The rotor power transfer circuit according to claim 1, wherein:

the rotor winding excitation modes include a freewheeling excitation mode, the freewheeling excitation mode providing a source bypass connection for one or more of the rotor windings, the source bypass connection bypassing the source to independently connect together a positive terminal and a negative terminal of the rotor windings associated therewith.

4. The rotor power transfer circuit according to claim 1, wherein:

the rotor winding excitation modes include a decaying excitation mode, the decaying excitation mode providing a reverse connection for one or more of the rotor windings, the reverse connection electrically connecting the rotor winding associated therewith to the source with reversed polarity.

5. The rotor power transfer circuit according to claim 1, further comprising:

a DC link capacitor connected in a parallel between the source and the multiple leaf direct current DC-DC converter.

6. A rotor power transfer circuit for an electric motor, the electric motor operable for propelling a vehicle, comprising:

a multiple leaf direct current (DC)-to-DC (DC-DC) converter having a first branch and a second branch connected in parallel to a source of DC power, the first branch including a plurality of first switches operable for selectively controlling DC power transfer therethrough, the second branch including a plurality of second switches operable for selectively controller DC power transfer therethrough;

an electrical interface configured for electrically connecting the first and second branches with a plurality of rotor windings of the electric motor; and a controller operable for controlling the first and second switches according to a plurality of rotor winding excitations modes;

wherein:

the rotor winding excitation modes includes a powered excitation mode, the powered excitation mode transferring DC power from the source to one or more of the rotor windings;

the rotor windings includes a first rotor winding and second rotor winding;

the plurality of branches include a first branch and a second branch; and the powered excitation mode transfers the DC power simultaneously through the first branch and the second branch, with the first branch transferring the DC power to the first rotor winding and the second branch transferring the DC power to the second rotor winding.

7. The rotor power transfer circuit according to claim 6, wherein:

the first branch is phase shifted relative to the DC power transferred through the second branch.

8. The rotor power transfer circuit according to claim 7, wherein:

the first branch includes a first inside leg and a first outside leg connected in parallel across the source, the first inside leg including a first upper switch of the first switches connected in series with a first lower diode, the first outside leg including a first lower switch of the first switches connected in series with a first upper diode; and the second branch includes a second inside leg and a second outside leg connected in parallel across the source, the second inside leg including a second upper switch of the second switches connected in series with a second lower diode, the second outside leg including a second lower switch of the second switches connected in series with a second upper diode.

9. The rotor power transfer circuit according to claim 8, wherein:

the electrical interface connects a positive terminal of the rotor windings to the first inside leg between the first upper switch and the first lower diode and to the second inside leg between the second upper switch and the second lower diode; and electrical interface connects a negative terminal of the rotor windings to the first outside leg between the first lower switch and the first upper diode and to the second outside leg between the second lower switch and the second upper diode.

10. A rotor power transfer circuit for an electric motor of a vehicle, the electric motor having a plurality of rotor winding sets wrapped around each of a plurality of circumferentially spaced rotor poles, comprising:

a multiple leaf direct current (DC)-to-DC (DC-DC) converter having a first branch and a second branch connected in parallel to a source of DC power, the first branch including a plurality of first switches operable for selectively controlling DC power transfer therethrough, the second branch including a plurality of second switches operable for selectively controller DC power transfer therethrough;

an electrical interface having a first interface configured for electrically connecting the first branch with a first winding set of the rotor winding sets and a second interface configured for electrically connecting the second branch with a second winding set of the rotor winding sets; and a controller operable for controlling the first and second switches according to a plurality of rotor winding excitations modes.

11. The rotor power transfer circuit according to claim 10, wherein:

the rotor winding excitation modes includes a dual powered excitation mode, the dual powered excitation mode transferring DC power from the source simultaneously through the first and second branches respectively to the first and second rotor winding sets.

12. The rotor power transfer circuit according to claim 10, wherein:

the rotor winding excitation modes includes a powered-freewheeling excitation mode, the powered-freewheeling excitation mode transferring DC power from the source through the first branch to the first winding set and providing a source bypass connection for the second rotor winding set, the source bypass connection bypassing the source to independently connect together a positive terminal and a negative terminal of the second rotor winding set.

13. The rotor power transfer circuit according to claim 10, wherein:

the rotor winding excitation modes include a decaying excitation mode, the decaying excitation mode providing a reverse connection for the first and/or second rotor winding sets, the reverse connection electrically connecting the rotor winding associated therewith to the source with reversed polarity.

14. The rotor power transfer circuit according to claim 10, wherein:

the first branch includes a first inside leg and a first outside leg connected in parallel across the source, the first inside leg including a first upper switch of the first switches connected in series with a first lower diode, the first outside leg including a first lower switch of the first switches connected in series with a first upper diode; and the second branch includes a second inside leg and a second outside leg connected in parallel across the source, the second inside leg including a second upper switch of the second switches connected in series with a second lower diode, the second outside leg including a second lower switch of the second switches connected in series with a second upper diode.

15. The rotor power transfer circuit according to claim 14, wherein:

the electrical interface connects a first positive terminal of the first rotor winding set to the first inside leg between the first upper switch and the first lower diode;

the electrical interface connects a first negative terminal of the first rotor winding set to the first outside leg between the first lower switch and the first upper diode;

the electrical interface connects a second positive terminal of the second rotor winding set to the second inside leg between the second upper switch; and the electrical interface connects a second negative terminal of the second rotor winding set to the second outside leg between the second lower switch and the second upper diode.

16. The rotor power transfer circuit according to claim 1, wherein the first branch is phase shifted relative to the DC power transferred through the second branch.

17. The rotor power transfer circuit according to claim 16, wherein:

the first branch includes a first inside leg and a first outside leg connected in parallel across the source, the first inside leg including a first upper switch of the first switches connected in series with a first lower diode, the first outside leg including a first lower switch of the first switches connected in series with a first upper diode; and the second branch includes a second inside leg and a second outside leg connected in parallel across the source, the second inside leg including a second upper switch of the second switches connected in series with a second lower diode, the second outside leg including a second lower switch of the second switches connected in series with a second upper diode.

18. The rotor power transfer circuit according to claim 17, wherein:

the electrical interface connects a positive terminal of the rotor windings to the first inside leg between the first upper switch and the first lower diode and to the second inside leg between the second upper switch and the second lower diode; and electrical interface connects a negative terminal of the rotor windings to the first outside leg between the first lower switch and the first upper diode and to the second outside leg between the second lower switch and the second upper diode.

19. The rotor power transfer circuit according to claim 6, wherein:

the rotor winding excitation modes include a decaying excitation mode, the decaying excitation mode transferring DC power from one or more of the rotor windings to the source.

20. The rotor power transfer circuit according to claim 6, wherein:

the rotor winding excitation modes include a freewheeling excitation mode, the freewheeling excitation mode providing a source bypass connection for one or more of the rotor windings, the source bypass connection bypassing the source to independently connect together a positive terminal and a negative terminal of the rotor windings associated therewith.

* * * * *